US011283169B2

(12) United States Patent
Uyeno et al.

(10) Patent No.: US 11,283,169 B2
(45) Date of Patent: Mar. 22, 2022

(54) STEERABLE RF IMAGING RECEIVER USING PHOTONIC SPATIAL BEAM PROCESSING WITH IMPROVED RESOLUTION

(71) Applicant: Raytheon Company, Waltham, MA (US)

(72) Inventors: Gerald P. Uyeno, Tucson, AZ (US); Sean D. Keller, Tucson, AZ (US); Benn Gleason, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 72 days.

(21) Appl. No.: 16/822,873

(22) Filed: Mar. 18, 2020

(65) Prior Publication Data

US 2021/0296770 A1 Sep. 23, 2021

(51) Int. Cl.
*H01Q 3/26* (2006.01)
*G01S 13/89* (2006.01)

(52) U.S. Cl.
CPC .......... *H01Q 3/2676* (2013.01); *G01S 13/89* (2013.01)

(58) Field of Classification Search
CPC ............................. H01Q 3/2676; G01S 13/89
USPC ......................................... 342/372, 157, 354
See application file for complete search history.

(56) References Cited

U.S. PATENT DOCUMENTS 9,525,489 B2 *  12/2016  Schuetz .............. H04B 10/5165
9,800,346 B2 *  10/2017  Schuetz .................... H04B 1/16
10,164,712 B2 *  12/2018  Schuetz ............... H01Q 3/2676

OTHER PUBLICATIONS

Dennis W. Prather, "5G Moves into the light: Holographic massive MIMO," ComSoc Technology News, http://www.comsoc.org/ctn/5g-moves-into-light-holographic-massive-mimo, Jun. 2016, pp. 1-5.
Macario et al., "Full spectrum millimeter-wave modulation," Oct. 8, 2012 / vol. 20, No. 21 / Optics Express, pp. 23623-23629.
Schneider et al., "Radiofrequency signal-generation system with over seven octaves of continuous tuning," http://www.nature.com/doifinder/10.1038/nphoton.2012.339, pp. 1-5.
Wang et al., "Photonic Generation of High Fidelity RF Sources for Mobile Communications," DOI 10.1109/JLT.2017.2707411, Journal of Lightwave Technology, 2016, pp. 1-7.
Deroba et al., "Smart Antenna Using Element-level Photonic Up-conversion to Generate an Apodized Beam-space for Increased Spatial Isolation," IEEE Antennas and Wireless Propagation Letters, vol. ??, 2017, pp. 1-4.
Shi et al., "Ultrawideband Optically Fed Tightly Coupled Phased Array," Journal of Lightwave Technology, vol. 33, No. 23, Dec. 1, 2015, pp. 4781-4790.
Shi et al., "Conformal Wideband Optically Addressed Transmitting Phased Array With Photonic Receiver," Journal of Lightwave Technology, vol. 32, No. 20, Oct. 15, 2014, pp. 3468-3477.

(Continued)

*Primary Examiner* — Bo Fan
(74) *Attorney, Agent, or Firm* — Schwegman Lundberg & Woessner, P.A.

(57) ABSTRACT

An RF imaging receiver using photonic spatial beam processing focuses a composite optical signal into a spot on an optical detector array to extract an image of an RF scene. The receiver steers the composite optical signal to move the location of the spot to increase the detected power in the image and selectively turns off one or more detector pixels around the spot to reduce noise in the image.

21 Claims, 10 Drawing Sheets

(56) References Cited

OTHER PUBLICATIONS

Murakowski et al., "Photonic probing of radio waves for k-space tomography," vol. 25, No. 14 | Jul. 10, 2017 | Optics Express, pp. 15746-15759.
Schuetz et al., "A Promising Outlook for Imaging Radar," IEEE Microwave Magazine, May 2018, pp. 91-101.

* cited by examiner

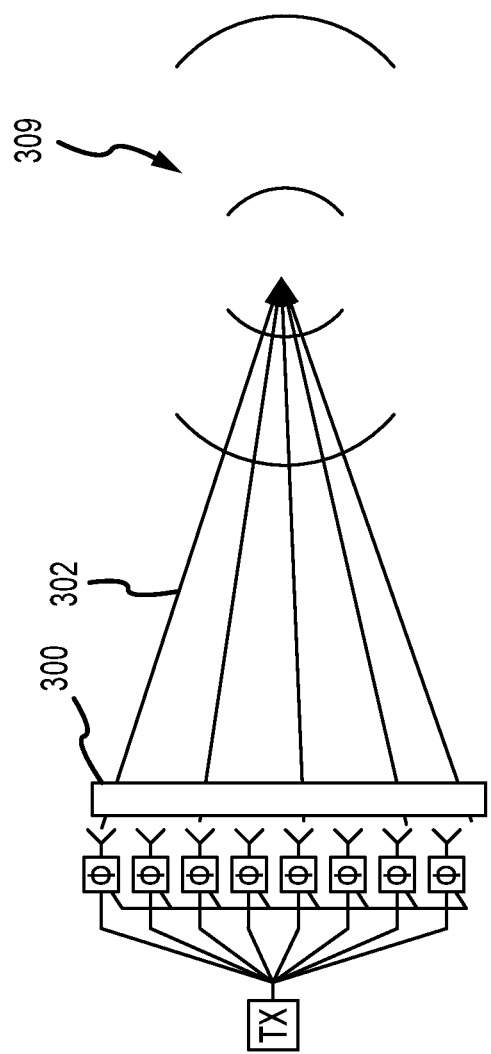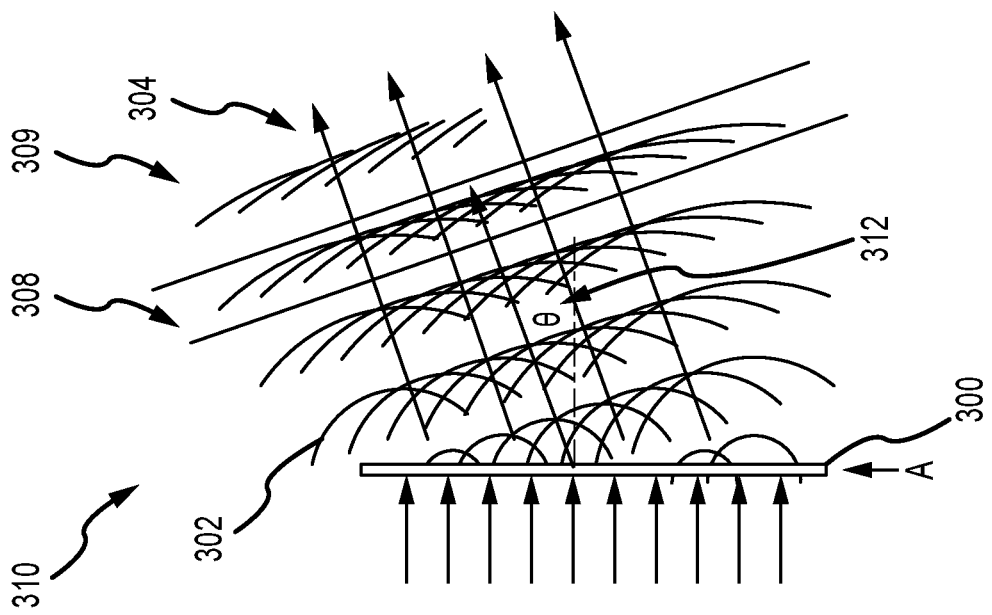
FIG.2A
FIG.2B

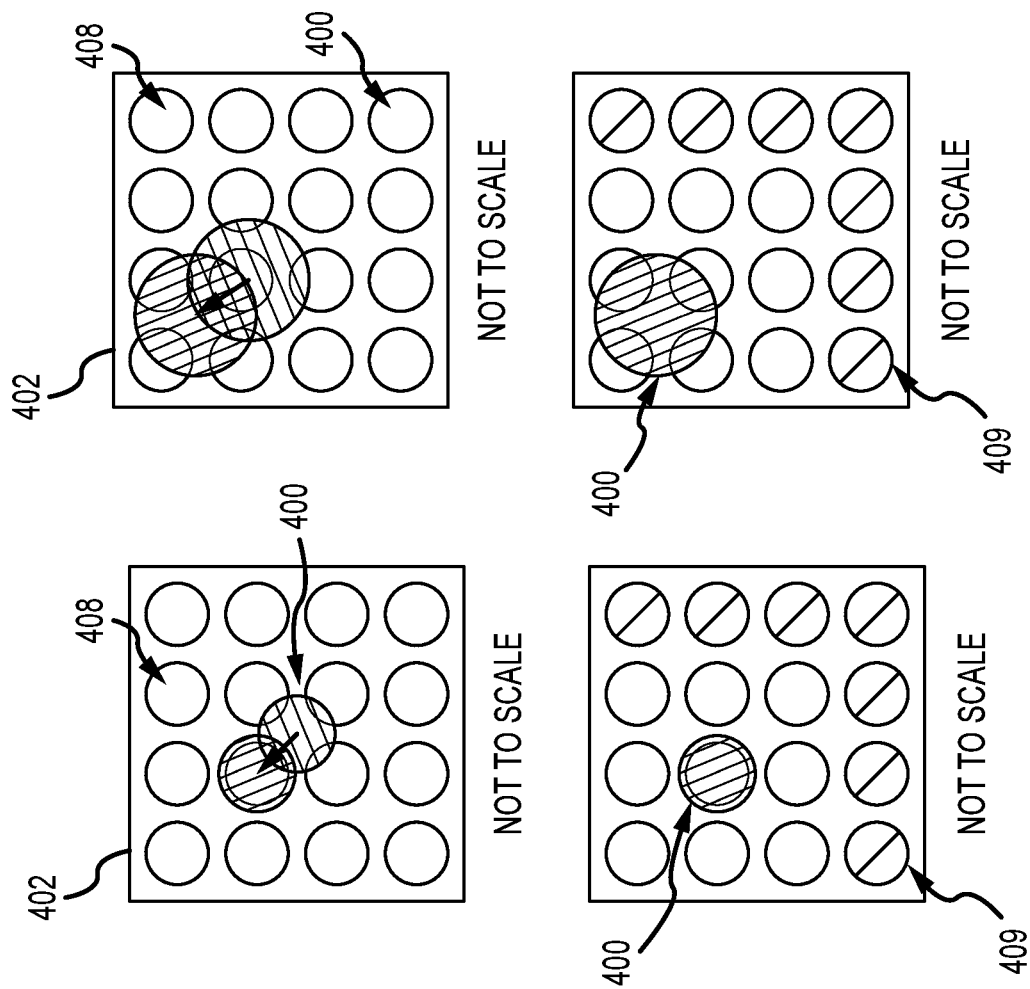
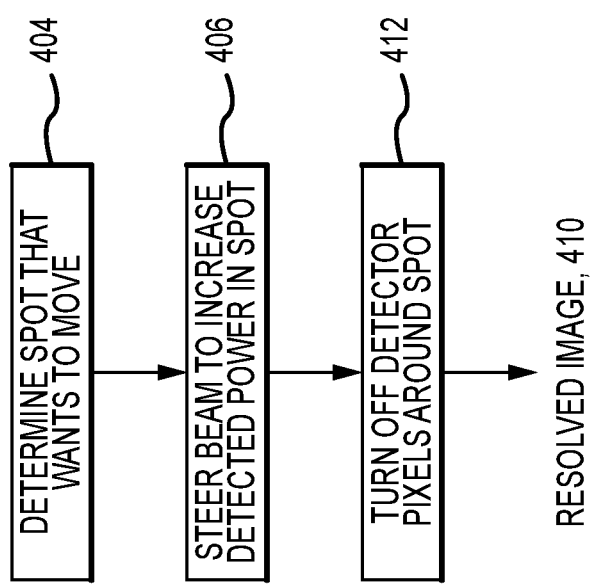

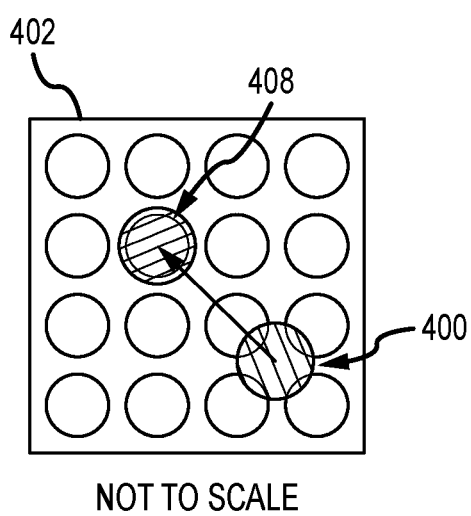
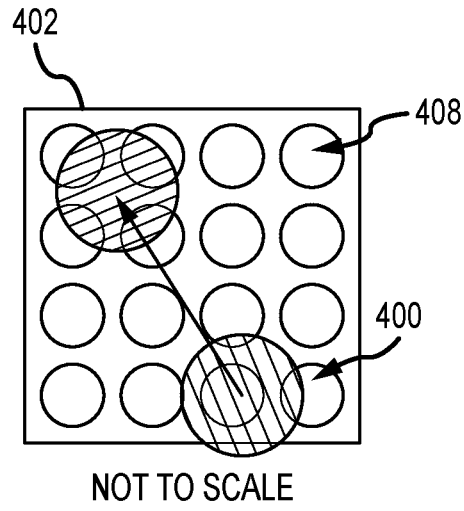
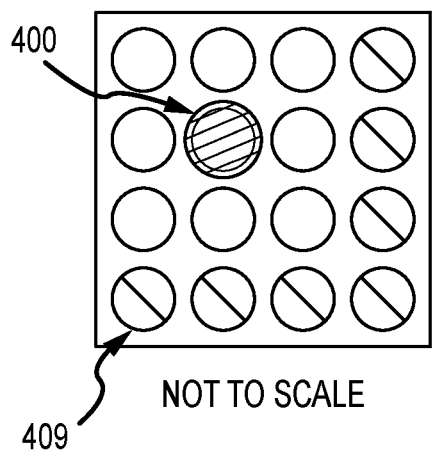
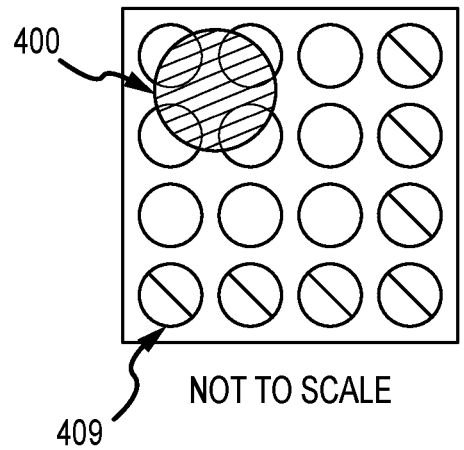
FIG.3D  FIG.3E

STEERABLE RF IMAGING RECEIVER USING PHOTONIC SPATIAL BEAM PROCESSING WITH IMPROVED RESOLUTION

BACKGROUND OF THE INVENTION

Field of the Invention

This invention relates to radar systems, and more specifically to imaging receivers that upconvert signals from the RF spectrum to an optical band to provide an image of an RF scene.

Description of the Related Art

Since its conception in the early 1900's, Radar systems have mostly used a single RF beam to probe the environment in search of objects of interest. Traditionally, this is done by scanning the beam over a region of interest and using tie of flight to determine the range of objects located within the beam. As such, a key figure of merit is the spatial extent and angular divergence of the RF beam, as it defines the lateral (or cross-range) resolution of detectable object. In addition, the operational bandwidth of the Radar determines the range resolution of detectable objects. In combination, these two metrics define the overall capability of the Radar system.

With the evolution of Radar systems developing from single analog RF beam transceivers to multi-beam digital systems, they have expanded their capability to illuminate, detect, and track multiple targets simultaneously. This being the case, there is typically a limit as to the number of beams a given Radar system can simultaneously transmit/receive (Tx/Rx) and the bandwidth over which it can operate. This relationship is commonly referred to as the beam-bandwidth product (BBP).

An imaging Radar system would form literally hundreds of millions of beams every fraction of a second by virtue of using a lens to provide spatial beam forming from every point source in a rendered scene. A range-gated system could add a range component to provide 3D imaging. However, this would require a BBP that is currently unavailable using modern electronics technology.

Christopher A. Schuetz et. al "A Promising Outlook for Imaging Radar: Imaging Flash Radar Realized Using Photonic Spatial Beam Processing" IEEE Microwave Magazine, vol. 19.3.91-101 (2018) and related U.S. Pat. No. 10,164,712 entitled "Phased-Array Radio Frequency Receiver" describe a passive millimeter wave (PmmW) imaging receiver that overcomes the BBP limitation. Incoming RF signals are received at each of a plurality of antenna elements that are arranged in a first pattern. The received RF signals from each of the plurality of antenna elements are electronically amplified via low noise amplifiers (LNAs) and modulated onto an optical carrier to generate a plurality of modulated optical signals that each have at least one sideband. The modulated optical signals are directed along a corresponding plurality of optical channels with outputs arranged in a second pattern corresponding to the first pattern. A composite optical signal is formed using light emanating from the outputs of the plurality of optical channels. Non-spatial information contained in at least one of the received RF signals is extracted by an optical detector in the form of an image of an RF scene within a field of view of the receiver.

A key aspect of the proposed approach is the conversion to optical wavelengths for processing. One potential downside of this process is that the process is now sensitive to phase variation in the optical fibers. A phase control process compares each channel of the array against a common coherent reference. This comparison is accomplished by separating the optical carrier from the modulated sidebands using a thin film filter and beating them against the reference on a low speed photodiode array resulting in a beat tone whose phase relative to the ramp frequency is representative of the phase through the optical path. Using these tones the phase is derived and a simple low speed phase calibration is implemented on each channel, which can be the same modulation used to encode the mmW signals. In this manner, the phases of each element of the array can be electronically adjusted via electronic delay elements at the outputs of the low noise amplifiers that act on the respective electrical signals to achieve a wide range of added functionality such as beam steering, electronically adjustable focus for near field applications, and engineering of the point spread function.

These RF imaging receivers and particularly ones incorporating sparse phased arrays, may not provide the required angle-angle location precision for certain applications. In short, these RF imaging receivers, which have less resolution than traditional optical imaging receivers, lack the capability to provide sub-pixel resolution of the target.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a steerable RF imaging receiver using photonic spatial beam processing. The imaging receiver is configured to convert received RF signals into modulated optical signals to focus a composite optical signal into a spot on an optical detector array and extract an image of an RF scene within a field of view of the RF imaging receiver. A beam steerer is configured to steer the composite optical signal and move the location of the spot on the optical detector array. A controller directs the beam steerer to move the spot to increase the detected power in the image and selectively turns off one or more optical detector pixels around the spot to reduce noise in the image.

In different embodiments, the beam steerer may be implemented electronically, by delay elements at the outputs of the low noise amplifiers that act on the RF electrical signals, or optically, by acting directly on the modulated optical signals to change path length or a refractive index. The later may, for example, be implemented with Risley prism or a liquid crystal (transmission or reflection mode) or MEMs spatial light modulator.

In different embodiments, the composite optical signal is steered such that detected power exceeds a threshold, detected power is maximized or a combination thereof. The signal may be first steered until a location of the focus is found that exceeds a threshold and then steered to find a maximum detected power in a local neighborhood of that location. Alternately, the signal may be steered to find the location of maximum power. If that power does not exceed a minimum threshold, the search continues until both criteria are satisfied. The controller may implement many different algorithms to search for focus locations that improved detected power. The algorithm may steer the signal to search an expanding square or spiral about the initial focus location, or may implement a "random walk" or "hill climbing" technique.

In different embodiments, the controller selectively turns off one or more detector pixels around the location of the spot to form a "buffer" of "on" pixels by determining the size (M×M pixels) of the spot and its location, turning off pixels the furthest away from the spot and continuing to turn off pixels toward the focus location until only an N×N area of pixels where N>M is left on. In some embodiments, N=M+1 to provide a single pixel buffer of active detector pixels around the spot. In certain embodiments, the controller receives a position cue and an uncertainty measure of a tracked object in the RF scene. The size of the buffer around the spot increases and decreases with the uncertainty measure of the position cue.

In different embodiments, if the spot size is less than or equal to the size of a single pixel on the optical detector array, the composite optical signal is steered to center the spot on a single pixel. The immediately surrounding pixels (3×3 grid) are left on, forming a single pixel buffer, and the pixels outside the 3×3 grid are turned off. If the spot size is greater than the size of a single pixel on the optical detector array, the composite optical signal is steered so that the spot overlaps a plurality of (M×M) pixels. The immediately surrounding pixels (M+2)×(M+2) pixels are left on, forming a single pixel buffer, and the pixels outside grid are turned off. In some cases, the spot is centered on the M×M pixels.

In an embodiment, if the response of all of the optical detector array pixels is assumed to be uniform across the array, the controller steers the spot to search a local neighborhood about an initial location of the spot that is less than plus or minus one pixel in the X and Y directions. If the response of all of the optical detector array pixels is assumed to be non-uniform across the array, the controller steers the spot to search a global neighborhood about an initial location of the spot that is larger than plus or minus one pixel in the X and Y directions.

In the different embodiments, it may be desirable to change the individual phase delays applied to the channels independently thereby producing a non-linear phase delay across the two-dimensional wavefront of the composite optical signal. Depending on how the individual phase is changed, the non-linear phase delay may include spherical or aspherical terms in addition to the linear phase term. The linear phase term dictates the coarse steering of the composite optical signal. Spherical and Aspherical terms allow for fine tuning of the steering angle, through methods such as focusing power and wavefront correction.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 2a through 2d are diagrams of a beam steerer that produces a phase delay having various combinations of linear, spherical and aspheric terms across a two-dimensional wavefront of the composite optical signal to steer the composite optical signal and move the location of the focus on the optical detector array;

FIGS. 3a, 3b and 3c, and 3d and 3e are, respectively, a flow diagram to increase the CNR of a resolved image in which the spot size is approximately the size of a detector pixel and the size of a few pixels in which the response of the detector pixels is assumed to be uniform and non-uniform;

DETAILED DESCRIPTION OF THE INVENTION

In the present invention, an RF imaging receiver (passive or active) is provided with a beam steerer (electronic or optical) to move the location of the focus or "spot" on the optical detector array. The beam steerer acts on either the individual electrical RF signals or the individual modulated optical signals to induce individual phase delays that produce a phase delay with a linear term, and possibly spherical or aspheric terms, across a two-dimensional wavefront of the composite optical signal to steer the composite optical signal. A controller directs the beam steerer to move the location of the spot on the detector array to increase the detected power in the image and selectively turns off one or more optical detector pixels around the location of the focus of the composite signal on the optical detector to reduce noise in the image. The combination of steering the spot to increase detected power and turning off pixels around the spot serves to increase a Contrast Noise Ratio (CN) of the image where CNR is defined as the ratio of the SUM of the signals to the SUM of the noises where "noise" includes like shot noise, readout noise, 1/f noise, etc. . . . . Increasing the CNR of the resolved image effectively increases the imaging resolution. Reducing the number of "on" pixels also reduces the power consumption of the detector and the processing circuits, which is useful for computationally intensive systems.

Figure 1:
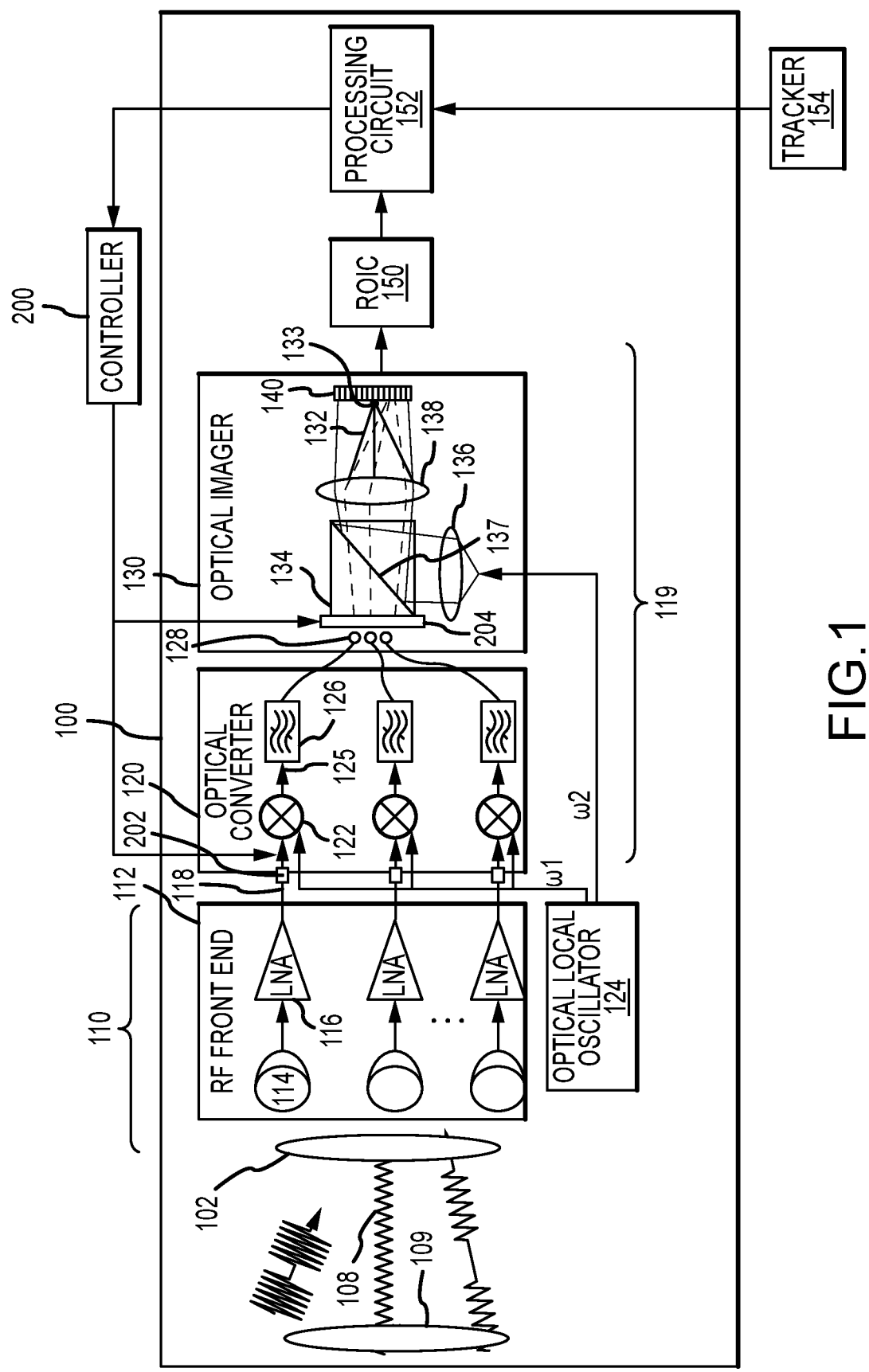
FIG. 1 is a block diagram of an embodiment of a steerable RF imaging receiver using photonic spatial beam processing.

Referring now to FIG. 1, an RF imaging receiver 100 is coupled to an electronic aperture 102 to receive RF signals 108 from at least one source in an RF scene 109 within a field of view of the receiver. The RF imaging receiver is a subsystem that receives and processes electromagnetic radiation in the RF band including frequencies between 0 GHz and 300 GHz or a narrower mmW band including frequencies between 30 GHz and 300 GHz using photonic spatial beam processing in a portion of the optical spectrum between in the near Infrared (NIR) band between 0.7 and 3.0 microns (~100 to ~430 THz) in a manner making possible the reconstruction of an image of the RF scene 101.

The architecture of the RF imaging receiver converts received RF signals to corresponding optical signals to leverage compact lightweight optical components, optical detection and optical processing capabilities. Only the front end phased-array antenna is implemented in the RF region of the electromagnetic spectrum. Implementation of an end-to-end RF imaging system would be bulky, expensive and beyond the processing capabilities of current electronics. A more complete description of an exemplary architecture is described in Christopher A. Schuetz et. al "A Promising Outlook for Imaging Radar: Imaging Flash Radar Realized Using Photonic Spatial Beam Processing" IEEE Microwave Magazine, vol. 19.3.91-101 (2018) and in related U.S. Pat. No. 10,164,712 entitled "Phased-Array Radio Frequency Receiver" issued Dec. 25, 2018 the contents of which are hereby incorporated by reference.

An RF front end 110 includes an RF phased array antenna 112 with a plurality of antenna elements 114 positioned within electronic aperture 102 in a first pattern. The received RF signals 108 at each antenna element 114 are suitably amplified by low noise amplifiers (LNAs) 116 and output via wires 118.

An optical upconverter 120 suitably includes an array of electro-optical (E/O) modulators 122 fed by a common optical local oscillator signal $\omega 1$ from an optical local oscillator 124 and the respective RF signals from wires 118 and upconverts each RF signal to a corresponding modulated optical signal 125, which may pass through optical filters 126. A plurality of optical channels 128 (such as optical fibers) are configured to carry the plurality of modulated optical signals 125. Each of the plurality of optical channels having an output to emanate the corresponding modulated optical signal out of the corresponding optical channel with the outputs of the plurality of optical channels arranged in a second pattern corresponding to the first pattern.

An optical imager 130 provides a first composite signal channel, adjacent to the plurality of outputs of the plurality of optical channels 128, configured to receive the plurality of modulated optical signals to form a composite optical signal 132. Optical imager 130 includes an optical beam combiner 134 having a first input couple to the outputs of the plurality of optical channels 128 arranged in a second pattern corresponding to the first pattern and a second input fed by optical local oscillator signal $\omega 2$ from optical local oscillator 124. An optic 136 images the optical local oscillator signal $\omega 2$ onto the beam combiner. As used herein, an "optical beam combiner" is any passive optical system that has at least two inputs and at least one output, the light at the output (i.e., the composite optical signal) being a linear combination of the light at the inputs. The composite optical signal is formed at an internal interface 137 of the optical beam combiner but is not useful until it exits the beam combiner at the output. The beam combiner may be a partially silvered mirror, for example, or it may include powered elements such as lenses. In some embodiments, it may include, for example, a grating or prism to combine different wavelengths. The patterns "correspond" when the physical arrangement of the optical fibers is the same as the physical arrangement of the antenna elements. The spacing of the optical fibers and antenna elements is different due to the different wavelengths. Detector optics 138 focus the composite optical signal 132 into a spot 133 on an optical detector array 140 to form an image of the at least one source in the RF scene. For an object in the far-field, the spot will appear as essentially a single spot. For an object in the near-field, the spot will appear as the superposition of many spots from different locations on the object. The "spot" is depicted herein as a single circle for illustration purposes only.

In some embodiments, each E/O modulator 122 is a phase modulator, which may include a nonlinear crystal (e.g., a lithium niobate crystal) the index of refraction of which depends on an electric field applied across it. In operation, a RF tone received by one of the antenna elements 114, amplified by one of the low noise amplifiers 116 and input to one of the E/O modulators 122 may cause phase modulation of the optical local oscillator signal, resulting, at the output of the E/O modulator 124, in a signal (the modulated optical signal) including a carrier component, an upper sideband, and a lower sideband. For large modulation depth, other sidebands may also be present, and the carrier may be suppressed (or entirely absent, if the modulation depth corresponds to a zero of the zeroth Bessel function of the first kind).

The phase of the upper sideband may be equal to the sum of the phase of the optical local oscillator signal and the phase of the RF tone. The output of each phase modulator may be connected to filter 126 (e.g., a high-pass or band-pass filter) that allows the upper modulation sideband to pass and rejects or blocks the carrier and the lower modulation sideband. As such, each of the modulators in such an embodiment acts as a phase-preserving frequency converter. An amplitude modulator (e.g., an electro-absorption modulator or a Mach-Zehnder interferometer having a phase modulator in each arm, the phase modulators being driven in opposite directions by the radio frequency modulating signal), similarly followed by a filter that passes one modulation sideband while blocking the carrier and the other modulation sideband, may similarly act as a phase-preserving frequency converter.

The phase-preserving property of the phase-preserving frequency converters may make it possible to form, on an optical detector array 140, an optical image or "spot" of the RF scene on the target. For example, near-planar RF waves received by the phased array antenna 112 from a distant RF point source may have a phase that varies nearly linearly across the antenna elements of the array antenna, with a phase slope across the array antenna corresponding to the direction from which the waves arrive. This phase slope may be preserved at the outputs of the optical upconverter 120, causing the optical detector optics 138 to focus the optical signal at the output of the optical converter 120 to a single detector in the optical detector array 140, the location of the point corresponding to the direction from which the RF waves arrive at the phased array antenna 112.

Each detector in the optical detector array 140 converts the received light into electric charge. A read out integrated circuit (ROIC) 150 measures the electric charge over a specified interval and outputs digital signals proportional to the charge. A processing circuit 152 converts this digital signal into the proper format to create an optical image of the scene. The optical detector array 140 may periodically be reset and the time interval between any such reset, and a subsequent read-out of the cumulative photon detections since the reset may be referred to as a "frame". The processing circuit 152 may receive data from the detectors in the optical detector array 140 from the read out integrated circuit 150 and cause a display to display images of the RF scene 109. The processing circuit 152 may receive a position cue and an uncertainty measure (e.g. a covariance matrix) from a tracker 154 or some other external source for a source/object/target in the RF scene.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single circuit wiring board (PCB) or distributed over several interconnected PCBs. A processing circuit may contain other processing circuits; for example a processing circuit may include two processing circuits, an FPGA and a CPU, interconnected on a PCB.

In accordance with the present invention, a controller 200 and a beam steerer are configured to induce phase delays on the individual modulated optical signals 125, which in turn produces a phase delay across a two-dimensional wavefront of the composite optical signal (the "beam") 132 to steer the composite optical signal at a steering angle $\theta$ and move the location of the focus or "spot" on the optical detector array. The steering angle is dependent on the number and spacing of the individual optical channels, wavelength of light and the phase delay across the wavefront. The beam steerer may comprise either electronic delay elements 202 that act on the received RF signals at the output of LNAs 116 or an optical beam steerer 204 that acts on the modulated optical signals. The optical beam steerer may be implemented as a Risley prism, which comprises one pair of optical prisms or "wedges" that rotate relative to each other and relative to the modulated optical signals to induce the individual phase delays on the individual modulated optical signals. When the wedges angle in the same direction, the angle of the refracted beam becomes greater. When the wedges are rotated to angle in opposite directions, they cancel each other out, and the beam is allowed to pass straight through. The Risley prism works by controlling the relative path lengths through which the individual modulated optical signals must pass through the glass material of the prism. Alternately, the optical beam steerer may be implemented with a liquid crystal (LC) spatial light modulator (SLM) or a MEMs SLM, both of which provide independent control of the induced phase on the different optical channels. The optical beam steerer may be positioned at the input to the optical beam combiner or at the internal interface of the optical beam combiner where the composite optical signal is formed.

In the general case, the beam steerer is controlled to induce phase delays to the individual modulated optical signals (or "channels") that produce a phase delay having only a linear term across the two-dimensional wavefront of the composite optical signal. The slope associated with that linear term dictating, in part, the steering angle. A single Risley prism may induce phase shifts to the individual channels to provide a linear phase shift.

Electronic beam steering and certain embodiments of optical beam steering such as the LC or MEMs SLMs provide the capability to address each channel independently. In some cases, it may be desirable to change the individual phase delays applied to the channels independently thereby producing a non-linear phase delay across the two-dimensional wavefront of the composite optical signal. Depending on how the individual phase is changed, the non-linear phase delay may include spherical or aspherical terms in addition to the linear phase term. The linear phase term dictates the coarse steering of the composite optical signal. Spherical and aspherical terms allow for the fine-tuning of the steering angle through methods such as focusing power and wavefront correction. Electronic steering or the SLM may be controlled to change the individual phase delays one at a time to make incremental changes to the phase delay across the two-dimensional wavefront.

As shown in FIG. 2a, a beam steerer 300 acts on the individual modulated optical signals 302 to induce individual phase delays 304 on those modulated optical signals 302 that produce a phase delay 308 with a linear term across a two-dimensional wavefront 309 of the composite optical signal 310 to steer the signal at steering angle $\theta$ 312. When the phase delay of each modulated optical signal 306 is increased in either the X or Y direction (or a combination thereof) the two-dimensional wavefront of the composite optical exhibits phase delay 308. To move UP, apply a linear phase shift that DECREASES from top to bottom. To move DOWN, apply a linear phase shift that INCREASES from top to bottom. To move LEFT apply a linear phase shift on the channels that DECREASES from left to right, and to move RIGHT a linear phase shift that INCREASES from left to right. The steering angle may be controlled to move the spot in sub-pixel step-sizes, pixel or larger step-sizes or a combination thereof.

As shown in FIG. 2b, beam steerer 300 acts on the individual modulated optical signals 302 to induce a spherical term such that the signals focus at a point. The two dimensional wavefront 309 will have a curvature. If the linear term is zero, the curvature will be the radius of a circle.

Figure 2C:
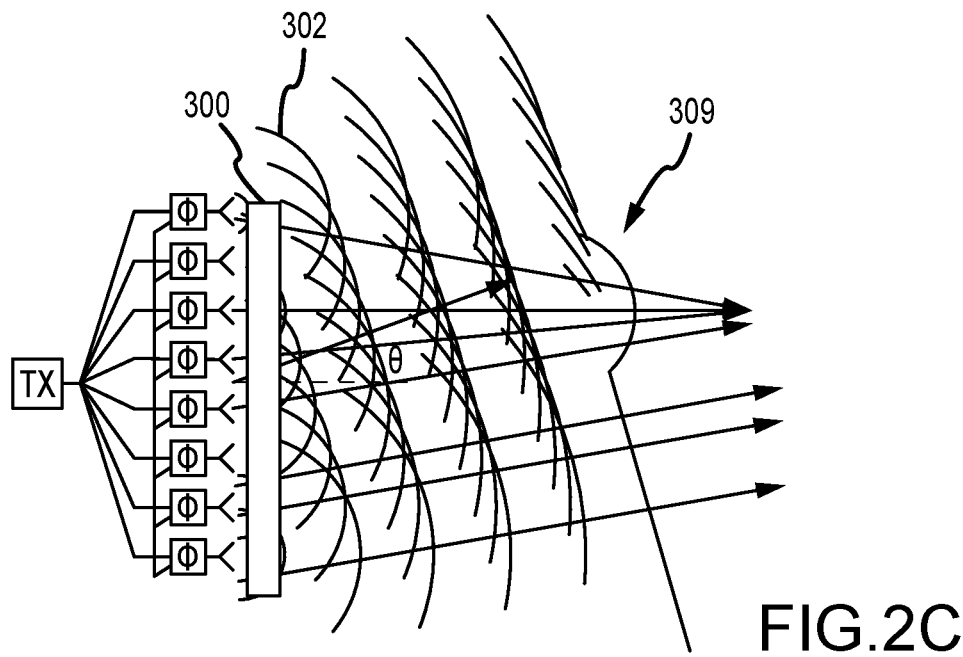
Figure 2D:
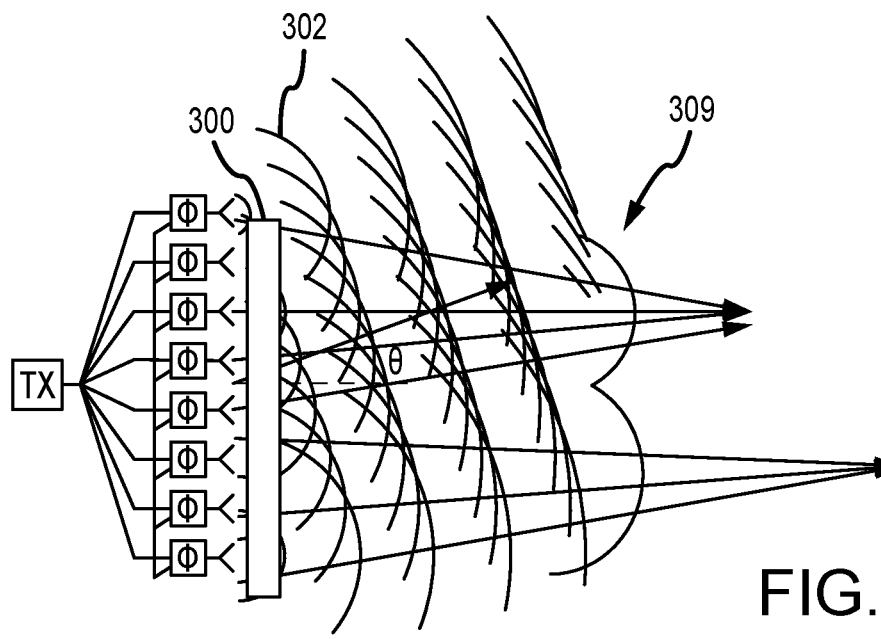

As shown in FIG. 2c, beam steerer 300 acts on the individual modulated optical signals 302 to induce an aspherical term that bends some of the signals 302. The two dimensional wavefront 309 has a curvature that changes across the wavefront.

As shown in FIG. 2c, beam steerer 300 acts on the individual modulated optical signals 302 to induce two different spherical term such that the signals focus at two different points and two dimensional wavefront 309 exhibits two different radii.

The ability through the beam steerer to independently control the phase delay to the different channels allows for more flexible control over the two-dimensional wavefront to finely steer the composite optical signal to improve detected power on the optical detector array. Furthermore, the beam steerer can be controlled to make the changes to the phase delays on the different channels incrementally, or one at a time, to better control the steering angle and improve detected power.

The search space, method of searching and conditions for terminating the search can depend on multiple factors including but not limited to the spot size, processing power/time requirements, position uncertainty from the tracker or other source, CNR requirements and the quality/price of the optical detector array. As to the latter, an optical detector array may be specified as having an interior zone 1, zone 2 and zone 3 going outwards from the center of the array. In zone 1, the array may be specified as having zero defective pixels and uniformity of pixel response. Zone 2 may tolerate individual pixel or row/column failures and zone 3 may tolerate clusters of detective pixels. In addition to defective pixels, the response of the pixels may simply exhibit some non-uniformity. This may occur in less expensive detectors or ones in which non-uniformity calibration is not performed. If one assumes uniform pixel response across the array, the search space can be limited to plus/minus ½ pixel in the X and Y directions from the initial location of the spot to find a location of maximum detected power. If one assumes non-uniform pixel response across the array, the search space may be expanded to a global neighborhood of the initial location that is greater than plus/minus a single pixel in the X and Y directions. The size of that search space may depend on in which zone the initial spot location resides and the requirements for terminating the search.

Referring now to FIGS. 3a-3e, in accordance with the present invention, the processing circuit determines a spot 400 on the optical detector array 402 that wants to move (step 404). For example, the system identifies a target in the far field but lacks the requisite CNR/resolution to process the target for any number of tasks including acquisition, discrimination, tracking, aimpoint selection etc. The processing circuit and controller issue commands to control the beam steerer to steer the beam (the composite optical signal) to move the location of the spot 400 on the optical detector array 402 to increase detected power in the spot (step 406). The path taken may be deterministic, random or based on results. For example, the path could simply spiral outward from the present location. Alternately the path could follow a "random walk" or a gradient descent or hill-climbing algorithm. The tradeoff is complexity vs performance in identify a location for the spot to increase detected power. The search may terminate upon finding a location at which the detected power in the spot exceeds a threshold (e.g. an amount of measured photo current, current or power) or the detected power in the spot is a maximum within a local neighborhood or prescribed search period (e.g. amount of time or number of steps). As will be discussed, the two techniques may be combined. As previously described, the path is dictated by the steering angle of the beam. The steering angle may be governed by a linear or non-linear phase across the two-dimensional wavefront of the beam, which may be changed by simultaneous modifications to all of the channels or incremental modifications to each optical channel one at a time.

For a case in which pixel uniformity is assumed, as shown in FIG. 3b, spot 400 is equal to or less than the size of a pixel 408 in the optical detector array 402. In this case, spot 400 is moved in a search area bounded by plus/minus ½ pixel in the X and Y directions and preferably centered on a pixel 408 to maximize detected power. If a thresholding algorithm is employed, the search may terminate prior to centering the spot on the pixel and achieving maximum detected power. As shown in FIG. 3c, spot 400 is larger in size than pixel 408. In this case, spot 400 is moved in a search area bounded by plus/minus ½ pixel in the X and Y directions and may overlap a single pixel or, in the case of a "top hat" or similarly shaped spot, overlap multiple pixels, perhaps being centered on a group of pixels, to maximize detected power. If a thresholding algorithm is employed, the search may terminate before finding the maximum detected power.

For a case in which pixel response is assumed to be non-uniform, as shown in FIG. 3d, spot 400 is equal to or less than the size of a pixel 408 in the optical detector array 402. In this case, spot 400 is moved in a search area bounded by plus/minus N pixels where N>1 in the X and Y directions and preferably centered on a pixel 408 to maximize detected power. If a thresholding algorithm is employed, the search may terminate prior to centering the spot on the pixel and achieving maximum detected power. As shown in FIG. 3c, spot 400 is larger in size than pixel 408. In this case, spot 400 is moved in a search area bounded by plus/minus N pixels where N>1 in the X and Y directions and may overlap a single or multiple pixels, perhaps being centered on a group of pixels, to maximize detected power. If a thresholding algorithm is employed, the search may terminate before finding the maximum detected power.

Once the location of the spot 400 has been determined, the processing circuit and controller selectively turns off one or more optical detector array pixels 409 around the location of the spot on the optical detector array to reduce noise in the image and increase a CNR of the resolved image 410 (step 412). In one embodiment, all pixels outside the spot (e.g. a single pixel or M×M group of pixels) may be turned off. In another embodiment, a buffer, perhaps a single pixel, is provided around the spot to accommodate measurement uncertainty to capture motion of the spot. The size of the buffer may increase and decrease with the position uncertainty measure provided by the tracker or another external source.

Figure 4A:
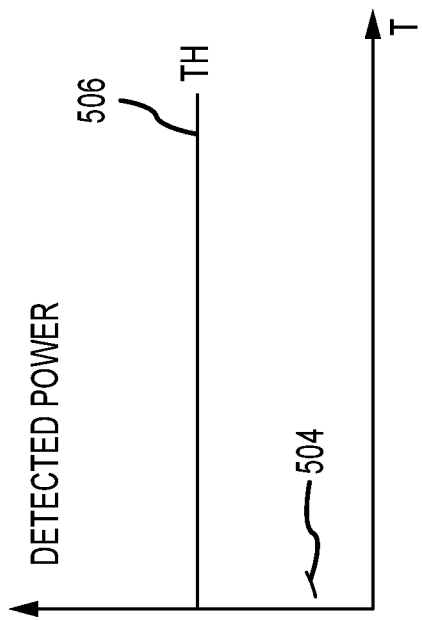
FIGS. 4a and 4b illustrate an embodiment for steering the beam to ensure that detected power exceeds a threshold.
Figure 4A:
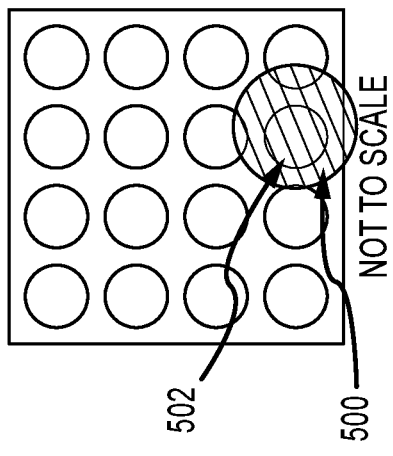
Figure 4B:
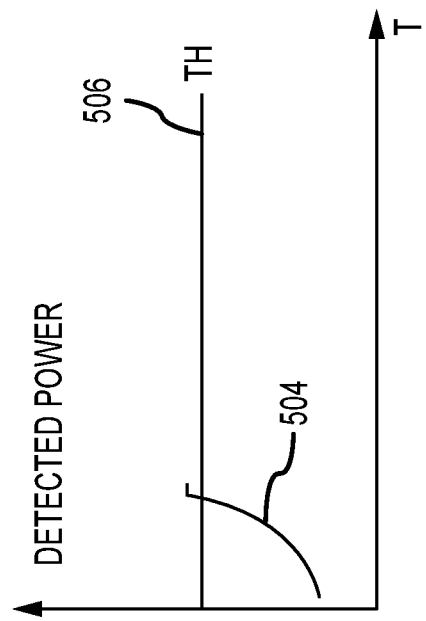
Figure 4B:
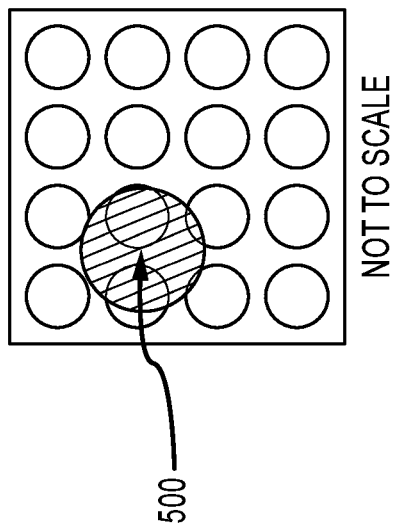

Referring now to FIGS. 4a and 4b in which pixel uniformity is not assumed, a spot 500 having a spot size in excess of a single detector pixel is roughly centered on a single detector pixel 502, which produces a detected power 504. The processing circuit/controller commands the beam steerer to move the location of spot 500 until the detected power 504 exceeds a threshold 506 (e.g. current or power). As shown, spot 500 overlaps a pair of detector pixels 502 such that a greater portion of the spot is detected. The spot may be controlled to follow a spiral about its initial location, a random walk or a gradient descent/hill-climbing path until the threshold on detected power is satisfied.

Figure 5:
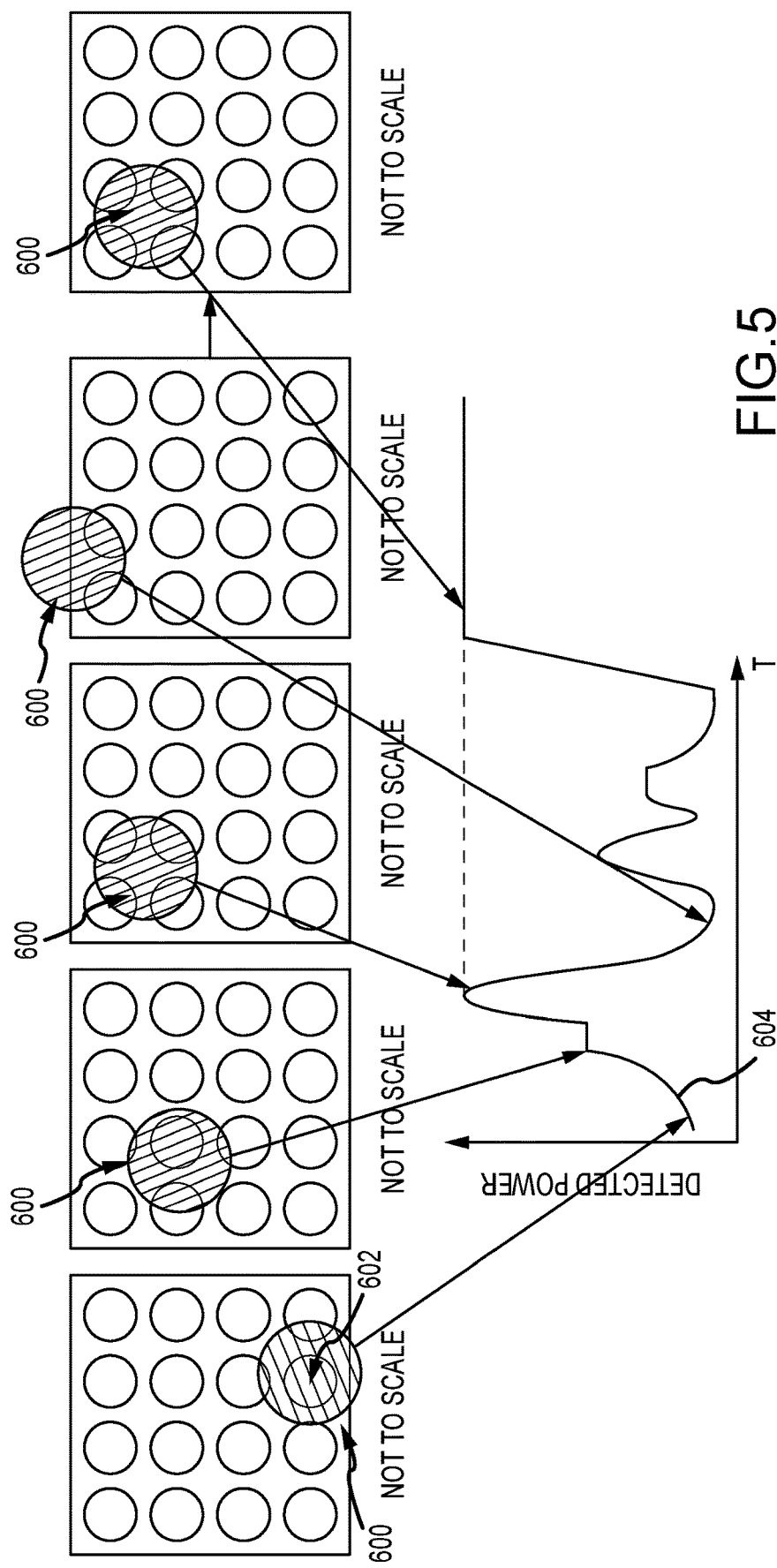
FIG. 5 illustrates another embodiment for steering the beam to maximize detected power in a search area.

Referring now to FIG. 5 in which pixel uniformity is not assumed, a spot 600 having a spot size in excess of a single detector pixel is roughly centered on a single detector pixel 602, which produces a detected power 604. The processing circuit/controller command the beam steerer to move the location of spot 600 to find a maximum detected power within a given neighborhood of the initial location of the spot or with a certain number of steps. At each new location, the detected power is measured and recorded with the location. Once the neighborhood has been searched or the number of steps exhausted, the location of the spot with maximum detected power is selected and the beam is steered to that location. Again, the spot may be controlled to follow a spiral about its initial location, a random walk or a gradient descent/hill-climbing path until the search is completed. By comparison to the thresholding algorithm, this approach did identify the same position that satisfied the threshold criterion. However, the algorithm continued to search and found a better solution in which the spot 600 was centered on a group of four detector pixels 602 resulting in increased detected power.

Figure 6A:
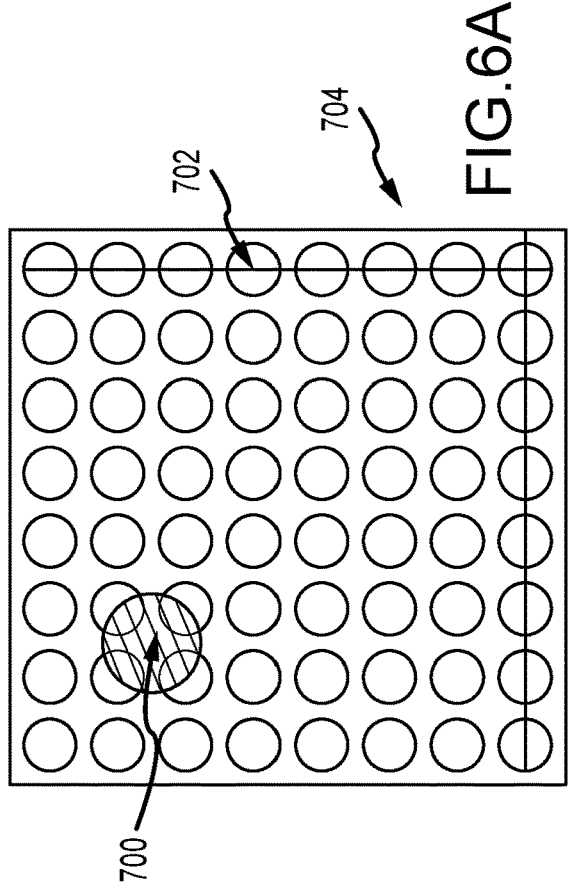
FIGS. 6a-6c illustrate an embodiment for selectively turning off pixels around the focus of the composite optical signal to reduce noise.
Figure 6B:
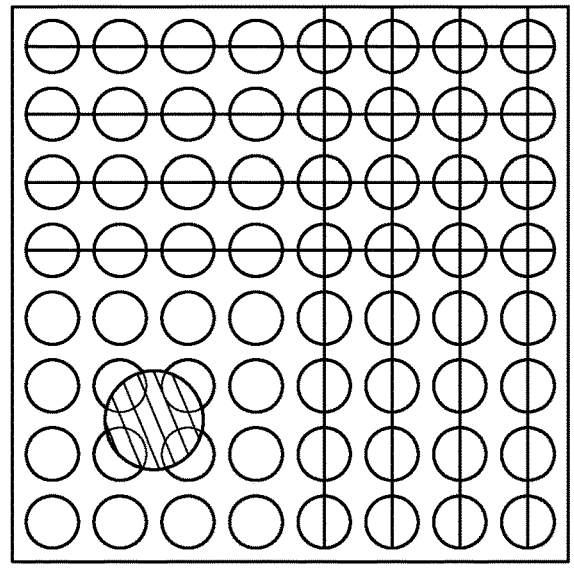
Figure 6C:
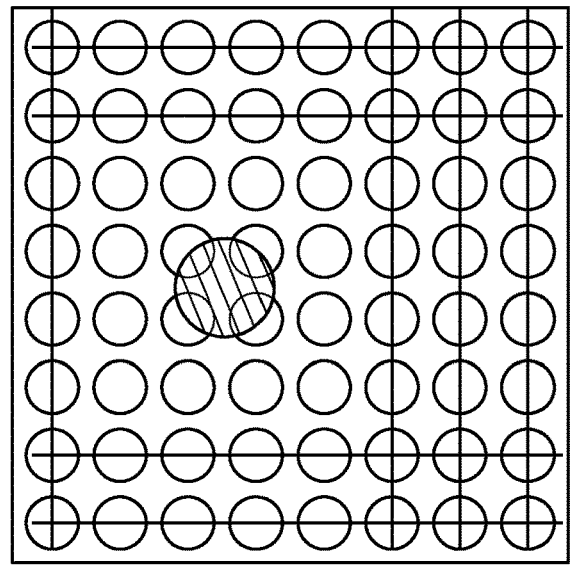
Figure 7:
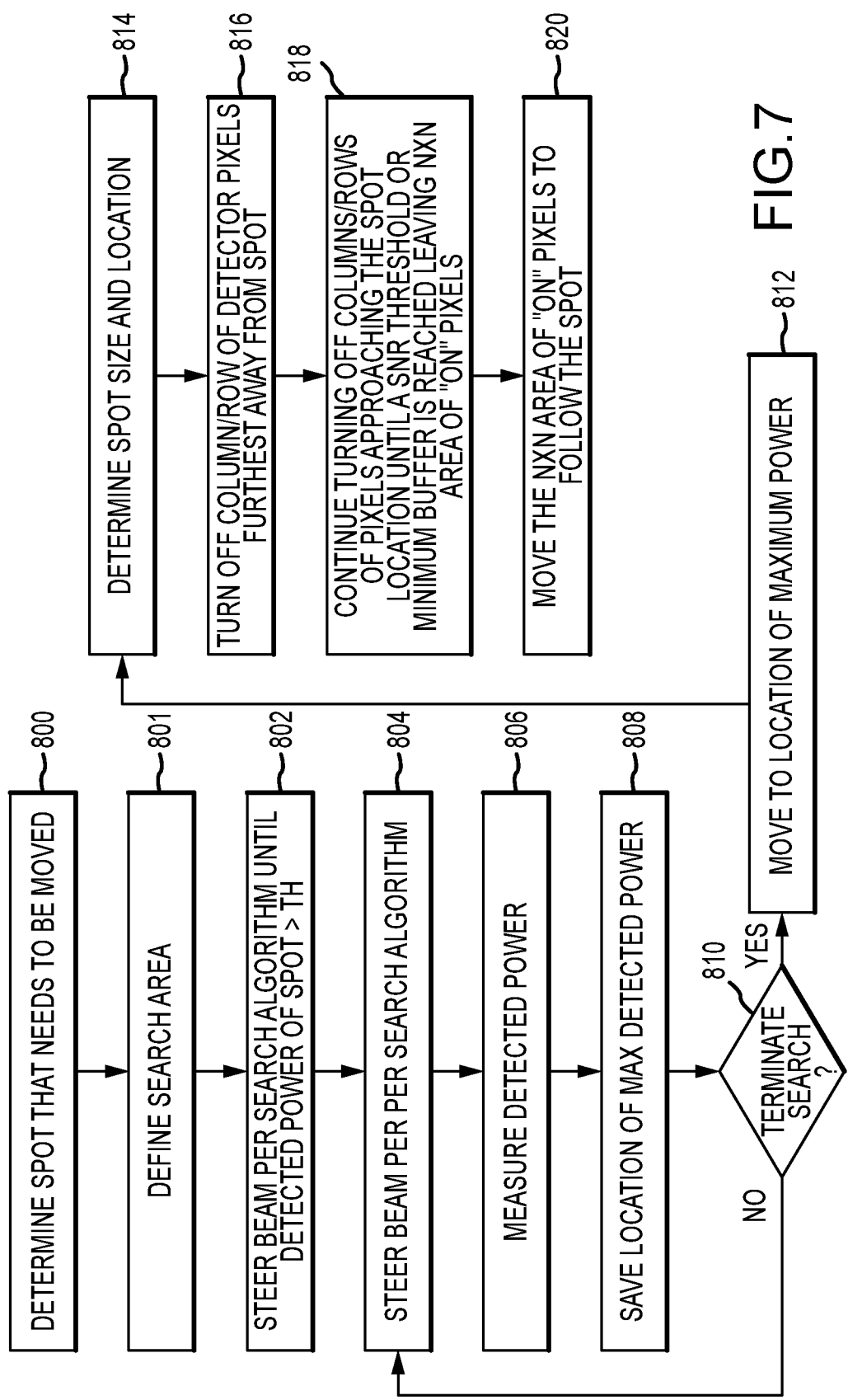
FIG. 7 is a flow diagram of a hybrid steering algorithm to optimize detected power and reduce noise.
Figure 8C:
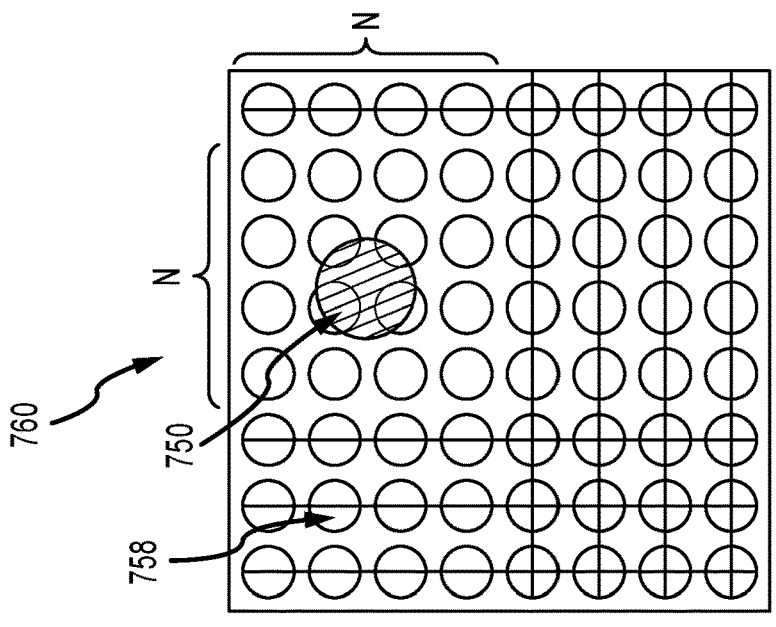
FIGS. 8a-8c are illustrations of an embodiment of the hybrid steering algorithm.
Figure 8B:
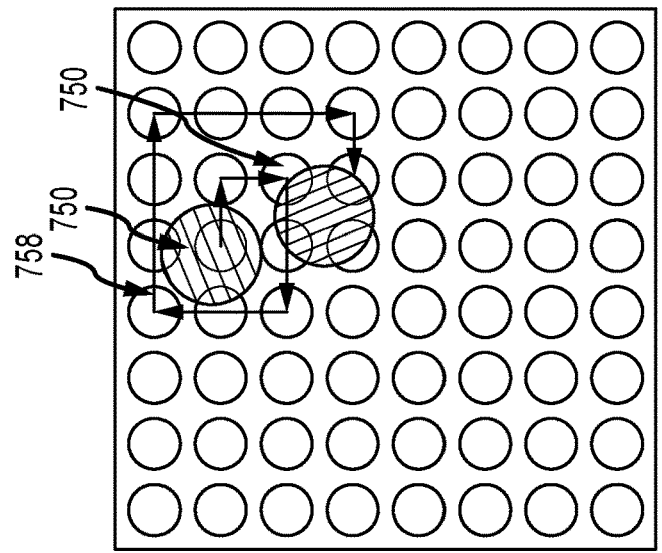
Figure 8A:
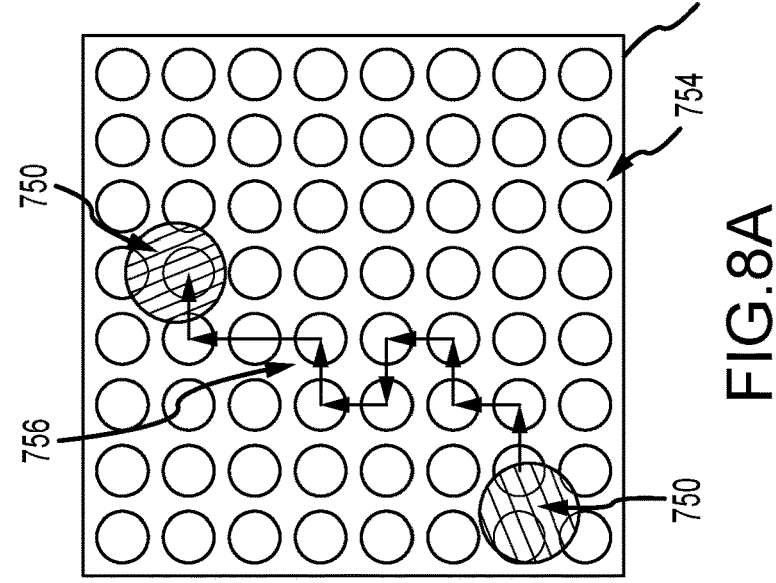

Referring now to FIGS. 6a through 6c, once the location of a spot 700 has been determined that increases or maximizes detected power, the processing circuit/controller initiate a process to selectively turns off one or more detector pixels 702 around the location of the spot 700 on an optical detector array 704 to reduce noise in the resolved image. The first step is to determine the size of spot 700 (i.e., how many M×M pixels) does it cover and where is the spot located on the array. Once the spot size and location are determined, the algorithm turns off detector pixels 702 furthest away from spot 700 and continues turning off detector pixels toward the location of the spot until only an N×N area of pixels where N>=M is left on. If spot 700 moves, either do to beam steering or target motion, the location of the N×N area is moved to follow the spot.

In one case, if the spot size is less than or equal to the size of a single detector pixel, the spot may be centered on a single detector pixel. The noise reduction algorithm could turn off every pixel outside this 1×1 grouping. However, do to measurement error and the need to capture motion of the spot, a buffer of at least one pixel is placed around the spot such that a 3×3 area of "on" pixels moves with the spot. A larger buffer would result in a larger area but more noise, which may be sufficient provided a CNR threshold is satisfied.

In another case, if the spot size is larger than or equal to the size of a single detector pixel, the spot may be located to overlap M×M pixels where M is one or more. If the spot is tightly focused, the algorithm may center the spot on a single pixel. If the spot is flat such as in a "top hat", the algorithm may center the spot on multiple pixels. Again, the noise reduction algorithm could turn off every pixel outside this M×M grouping but preferably provides a buffer. The N×N area may be equal to (M+2)×(M+2) for example. A spot size centered on four detector pixels would thus have a 4×4 area of "on" pixels that moves with the spot.

The size of the buffer i.e., the number of "on" pixels to either side of the spot can be fixed or variable. The larger the buffer, the greater the detector's ability to capture measurement uncertainty or motion of the object in the RF scene but the greater the detected noise. As previously mentioned, the size of the buffer can increase and decrease with the position uncertainty measure provided by the tracker or other external source. If the position uncertainty is low, the buffer can be small, possibly a single pixel, to reduce noise. If the position certainty is high, the buffer can be increased to ensure detection of the spot and capture of any object motion.

Referring now to FIGS. 7 and 8a-8c, a hybrid algorithm combines both the thresholding and optimization algorithms to locate the spot and noise reduction to maximize CNR in the resolved image. The combination of algorithms helps to ensure that the optimization algorithm finds a global optimum (maximum detected power) rather than a local optimum and does so efficiently. This algorithm may steer the beam with only linear phase or may use the capability to individually and incrementally control each channel phase to induce spherical or aspheric terms into the phase to provide fine tuning of the steering angle. The use of non-linear terms may be particularly applicable when trying to locate the optimum detected power.

The algorithm first determines that there is a spot 750 (e.g. a target is detected) on an optical detector array 752 with detector pixels 754 that needs to be moved (step 800). The algorithm defines a search area about the initial location of the spot (step 801). The size of the search area will depend on whether one assumes that the pixel response is uniform across the array. The algorithm steers the beam within the search per a designated search algorithm until the detected power of the spot exceeds a threshold (step 802). In this example pixel uniformity is not assumed, the search algorithm is a "random walk" algorithm that follows a random path 756 until a location is found at which the detected power exceeds the threshold. To find the maximum or optimum detected power in a local neighborhood about that location, the algorithm steers the beam per another designated search algorithm (a spiral path 758 in this case) (step 804), measures the detected power (step 806) and saves the location of the maximum detected power (step 808). These steps repeat as the spot steps along the spiral path 758 until a termination condition is reached (step 810). The termination condition could be that the search exhausts a defined neighborhood (e.g. Y×Y pixels) about the starting location or could be a designated amount of time or steps. Once terminated, the spot is moved to the location of maximum power (step 812).

The noise reduction algorithm determines the spot size and location (step 814). The algorithm turns off columns and rows of detector pixels 760 furthest away from spot 750 (step 816) and continues turning off columns and rows of detector pixels 760 approaching spot 750 until either a CNR threshold or a minimum buffer requirement is reached leaving an N×N area 762 of "on" pixels around spot 750. Thereafter, the N×N area of "on" pixels moves to follow the spot 750.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An RF imaging receiver, comprising:
   an RF imaging receiver including
      a phased-array antenna including a plurality of antenna elements arranged in a first pattern configured to receive an incoming RE signal at each antenna element;
      a plurality of electro-optic modulators configured to modulate the received RF signals from each of the plurality of antenna elements onto an optical carrier to generate a plurality of modulated optical signals, each modulated optical signal having at least one sideband;
      a plurality of optical channels configured to carry the plurality of modulated optical signals, each of the plurality of optical channels having an output, the outputs of the plurality of optical channels arranged in a second pattern corresponding to the first pattern;
      a composite signal channel configured to receive the plurality of modulated optical signals from the outputs of the plurality of optical channels to form a composite optical signal;
      detector optics configured to focus the composite optical signal into a spot; and
      an optical detector array having a plurality of active pixels configured to extract from the spot an image contained in at least one of the received RF signals;
   a beam steerer configured to steer the composite optical signal at a steering angle to move the location of the spot on the optical detector array; and
   a controller configured to direct the beam steerer to steer the composite optical signal to move the location of the spot on the optical detector array to increase the detected power in the image and to selectively turn off one or more active optical detector array pixels around the spot to reduce noise in the image.

2. The RF imaging receiver of claim 1, wherein the beam steerer comprises either electronic delay elements that act on the received RF signals or an optical device that acts on the modulated optical signals to induce individual phase delays in the modulated optical signals that produce a phase delay with a linear term across a two-dimensional wavefront of the composite optical signal to steer the composite optical signal at a steering angle.

3. The RF imaging receiver of claim 2, wherein the beam steerer is configured to act independently on the individual modulated optical signals to change the individual phase delays one at a time to add spherical or aspherical terms to the phase delay to fine tune the steering angle of the composite optical signal.

4. The RF imaging receiver of claim 1, wherein the controller directs the beam steerer to move the spot on the optical detector array until the detected power exceeds a threshold.

5. An RF imaging receiver comprising:
an RF imaging receiver configured to convert received RF signals into modulated optical signals to focus a composite optical signal into a spot on an optical detector array and extract an image of an RF scene within a field of view of the RF imaging receiver from the spot;
a beam steerer configured to steer the composite optical signal and move the location of the spot on the optical detector array; and
a controller that directs the beam steerer to move the location of the spot on the detector to increase the detected power in the image and selectively turns off one or more optical detector array pixels around the spot to reduce noise in the image;
wherein detected power in excess of the threshold establishes a coarse location for the spot, the controller further directs the beam steerer to move the spot on the optical detector array to find a maximum detected power in a local neighborhood about the coarse location.

6. The RF imaging receiver of claim 1, wherein the controller directs the beam steerer to move the location of the spot within a neighborhood to find a maximum detected power.

7. The RF imaging receiver of claim 1, wherein the controller forms a buffer of at least one on pixel around the spot and turns off all of the pixels outside the buffer.

8. An RF imaging receiver, comprising:
an RF imaging receiver configured to convert received RF signals into modulated optical signals to focus a composite optical signal into a spot on an optical detector array and extract an image of an RF scene within a field of view of the RE imaging receiver from the spot;
a beam steerer configured to steer the composite optical signal and move the location of the spot on the optical detector array; and
a controller that directs the beam steerer to move the location of the spot on the detector to increase the detected power in the image and selectively turns off one or more optical detector array pixels around the spot to reduce noise in the image,
wherein the controller forms a buffer of at least one on pixel around the spot and turns off all of the pixels outside the buffer;
wherein the controller receives a position cue and an uncertainty measure of a tracked object in the RE scene, wherein a size of the buffer around the spot increases and decrease with the uncertainty measure of the position cue.

9. The RF imaging receiver of claim 8, wherein if the spot size is less than or equal to the size of a single detector pixel; the controller directs the beam steerer to center the spot on a single detector pixel.

10. The RF imaging receiver of claim 8, wherein if the spot size is larger than the size of a single detector pixel, the controller directs the beam steerer to center the spot on an M×M group of detector pixels where M is an integer of 1 or more.

11. An RF imaging receiver, comprising:
an RF imaging receiver configured to convert received RF signals into modulated optical signals to focus a composite optical signal into a spot on an optical detector array and extract an image of an RF scene within a field of view of the RF imaging receiver from the spot;
a beam steerer configured to steer the composite optical signal and move the location of the spot on the optical detector array; and
a controller that directs the beam steerer to move the location of the spot on the detector to increase the detected power in the image and selectively turns off one or more optical detector array pixels around the spot to reduce noise in the image,
wherein a response of all of the optical detector array pixels is assumed to be uniform across the array, wherein the controller steers the spot to search a local neighborhood about an initial location of the spot that is less than plus or minus one pixel in the X and Y directions.

12. The RF imaging receiver of claim 1 wherein a response of all of the optical detector array pixels is assumed to be non-uniform across the array, wherein the controller steers the spot to search a global neighborhood about an initial location of the spot that is larger than plus or minus one pixel in the X and Y directions.

13. A method of RF image processing comprising:
receiving an incoming RF signal at each of a plurality of antenna elements that are arranged in a first pattern;
modulating the received RF signals from each of the plurality of antenna elements onto an optical carrier to generate a plurality of modulated signals, each modulated signal having at least one sideband;
directing each of the plurality of modulated signals along a corresponding one of a plurality of optical channels, each of the plurality of optical channels having an output, the outputs of the plurality of optical channels arranged in a second pattern corresponding to the first pattern;
forming a composite optical signal using light emanating from the outputs of the plurality of optical channels;
focusing the composite optical signal into a spot
extracting with an optical detector array, from the spot, an image contained in at least one of the received RF signals;
steering the composite optical signal at a steering angle to move the location of the spot on the optical detector array to increase the detected power in the image; and
selectively turning off one or more detector pixels around the spot to reduce noise in the image.

14. The method of claim 13, wherein the composite optical signal is steered by applying phase delays to the modulated optical signals to establish a coarse steering angle and changing individual phase delays applied to the modulated optical signals one at a time to add spherical or aspherical terms to the phase delay to fine tune the steering angle.

15. The method of claim 13, wherein steering the composite optical signal comprises steering the composite optical signal to a location where the detected power exceeds a threshold.

16. The method of claim 13, wherein steering the composite optical signal comprises steering the composite optical signal to a location where the detected power is a maximum within a local neighborhood around an initial location of the spot.

17. The method of claim 13, further comprising forming a buffer of at least one on pixel around the spot and turning off all of the pixels outside the buffer.

18. The method of claim 17, further comprising receiving a position cue and an uncertainty measure of a tracked object in the RF scene and increasing and decreasing a size of the buffer around the spot with the uncertainty measure of the position cue.

19. The method of claim 13, further comprising assuming a response of all of the optical detector array pixels is uniform across the array, and steering the spot to search a local neighborhood about an initial location of the spot that is less than plus or minus one pixel in the X and Y directions.

20. The method of claim 13, further comprising assuming a response of all of the optical detector array pixels is non-uniform across the array, and steering the spot to search a local neighborhood about an initial location of the spot that is larger than plus or minus one pixel in the X and Y directions.

21. An RF imaging receiver, comprising:
 an RF imaging receiver configured to convert received RF signals into modulated optical signals to focus a composite optical signal into a spot on an optical detector array having a plurality of active pixels and extract an image of an RF scene within a field of view of the RF imaging receiver from the spot;
 a beam steerer configured to steer the composite optical signal and move the location of the spot on the optical detector array; and
 a controller that directs the beam steerer to move the location of the spot on the detector with sub-pixel resolution to increase the detected power of the spot on a particular active pixel or group of active pixels and selectively turns off one or more optical detector array active pixels around the spot to reduce noise in the image.

* * * * *

UNITED STATES PATENT AND TRADEMARK OFFICE
CERTIFICATE OF CORRECTION

| | |
|---|---|
| PATENT NO. | : 11,283,169 B2 |
| APPLICATION NO. | : 16/822873 |
| DATED | : March 22, 2022 |
| INVENTOR(S) | : Uyeno et al. |

It is certified that error appears in the above-identified patent and that said Letters Patent is hereby corrected as shown below:

In the Specification

In Column 4, Line 58, delete "101." and insert --109.-- therefor

In Column 6, Line 3, delete "124," and insert --122,-- therefor

In Column 8, Line 7, delete "306" and insert --302-- therefor

In the Claims

In Column 12, Line 19, in Claim 1, delete "RE" and insert --RF-- therefor

In Column 13, Line 1, in Claim 5, delete "receiver" and insert --receiver,-- therefor In Column 13, Line 33, in Claim 8, delete "RE" and insert --RF-- therefor In Column 13, Line 46, in Claim 8, delete "RE" and insert --RF-- therefor In Column 13, Line 51, in Claim 9, delete "pixel;" and insert --pixel,-- therefor Signed and Sealed this
Twelfth Day of July, 2022

Katherine Kelly Vidal
*Director of the United States Patent and Trademark Office*